United States Patent [19]

Toibana et al.

[11] Patent Number: 4,994,354
[45] Date of Patent: Feb. 19, 1991

[54] OPTICAL RECORDING MEDIA

[75] Inventors: Hisaharu Toibana; Mitsuyuki Kuroiwa; Takeshi Minoda; Akira Todo, all of Ichihara, Japan

[73] Assignee: Mitsui Petrochemical Industries, Ltd., Tokyo, Japan

[21] Appl. No.: 427,509

[22] Filed: Oct. 27, 1989

[30] Foreign Application Priority Data

Nov. 1, 1988 [JP] Japan .................................. 63-276739
Nov. 28, 1988 [JP] Japan .................................. 63-300357

[51] Int. Cl.$^5$ ........................ G03C 1/00; G03C 1/492; G03C 11/00; B32B 3/02
[52] U.S. Cl. ..................................... 430/495; 430/19; 430/270; 430/271; 430/945; 346/135.1; 369/284; 369/288; 428/64; 428/655
[58] Field of Search ............... 430/270, 495, 945, 523, 430/271, 19; 346/135.1; 428/64, 65, 209, 457, 461, 411.1, 500; 369/284, 288

[56] References Cited

U.S. PATENT DOCUMENTS 4,388,400  6/1983  Tabei et al. .......................... 430/346
4,433,340  2/1984  Mashita et al. .................... 346/135.1
4,702,991 10/1987  Takeoka et al. ..................... 430/270
4,874,808 10/1989  Minami et al. ....................... 524/291

Primary Examiner—Paul R. Michl
Assistant Examiner—Ashley I. Pezzner
Attorney, Agent, or Firm—Sherman and Shalloway

[57] ABSTRACT

Optical recording media disclosed herein are excellent in recording sensitivity as well as in the adhesion of the substrate to the recording layer, said substrate consisting of a random copolymer of ethylene and a cycloolefin and having a specific structure.

26 Claims, 2 Drawing Sheets

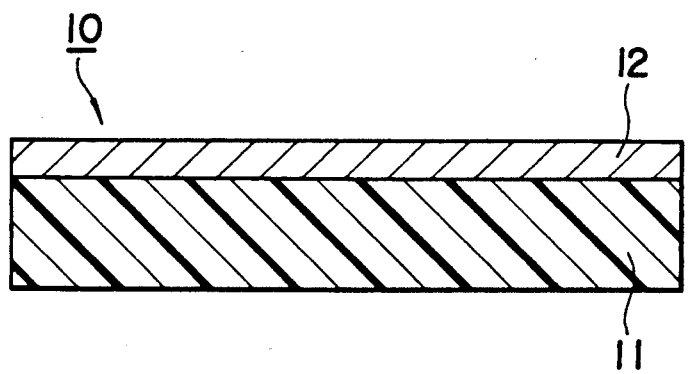
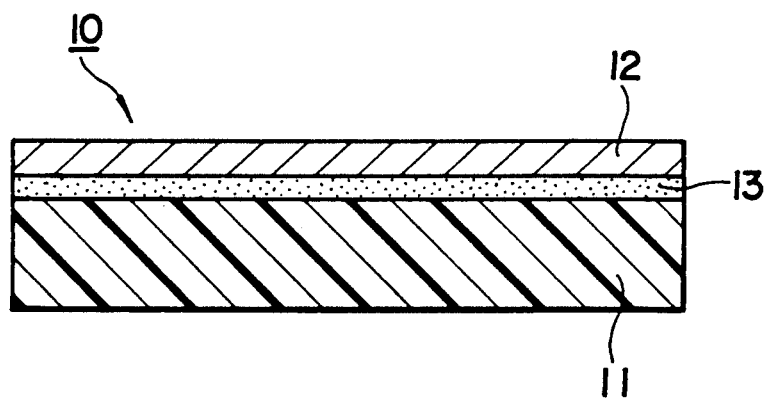

OPTICAL RECORDING MEDIA

FIELD OF THE INVENTION

This invention relates to optical recording media of the type wherein pits corresponding to information are formed on a recording layer provided on a substrate by irradiation with beam of energy such as light or heat.

BACKGROUND OF THE INVENTION

There are two types of optical recording media, one of which is to form physically deformed portions such as holes or concavities at a certain place of a recording layer by irradiation with beam of energy, and the other of which is to form portions having been changed in optical properties such as refractive index and reflectance at a certain place of a recording layer by irradiation with beam of energy.

Recording layers consisting essentially of low melting metal such as tellurium (Te) have heretofore been known as recording layers for the two types of the optical recording media (Japanese Pat. L-O-P Publns. Nos. 71195/1983 and 9234/1983.) Te thin film, typical of low-melting metallic films, is capable of forming thereon desired physically deformed portions or portions having been changed in optical properties (hereinafter generally called "pits") by irradiating a very low energy, and thus is very useful as a high sensitivity material. By sensitivity as used herein is meant that which is defined by energy (mJ/cm$^2$) required for forming pits per unit surface area.

Though the recording layers consisting essentially of Te are known, optical recording media comprising conventional substrate such as a polycarbonate resin substrate and these recording layers laminated thereon have such a problem that recording sensitivity is not always sufficient. Hence, it is demanded to provide optical recording media improved in recording sensitivity.

Further, the optical recording media comprising conventional substrate such as a polycarbonate resin substrate and the recording layer consisting essentially of Te laminated thereon have still such a problem that the adhesion of the substrate to the recording layer is insufficient. Therefore, a stage for removing water contained in the polycarbonate resin to be used as the substrate is required. Further, there is sometimes required a stage for treating the surface of the polycarbonate resin substrate with plasma to improve the adhesion of the substrate to the recording layer.

With the purpose of providing an optical recording medium which is improved in recording sensitivity as well as in the adhesion between the substrate and the recording layer, the present inventors prosecuted extensive researches and have found that optical recording media excellent in recording sensitivity as well as in the adhesion between the substrate and the recording layer can be obtained when a random copolymer having a specific structure, composed of ethylene and a cycloolefin unit is used as a substrate and a specific recording layer is laminated thereon. The present inventors have eventually accomplished the present invention on the basis of this finding.

Further, a relationship between the composition of a recording layer mainly comprising Te and the oxidation thereof have been studied to improve the oxidation resistance thereof.

For example, a Te film comprising C and H, and a Cr-comprising Te film have been proposed in Japanese Pat. Publn. No. 3320/1984 and Japanese Pat. L-O-P No. 63038/1984, respectively.

However, the proposed recording layers mainly comprising Te are not sufficiently oxidation-resistant.

OBJECT OF THE INVENTION

The present invention is intended to solve the above-described problems associated with prior arts, and an object of the present invention is to provide optical recording media excellent in recording sensitivity as well as in the adhesion between the substrate and the recording layer.

SUMMARY OF THE INVENTION

The first optical recording medium of the present invention comprises a substrate and a recording layer formed thereon, in which the recording layer is irradiated with beam of energy to form thereon pits corresponding to given pieces of information and thereby record the pieces of information, said recording layer being a thin film consisting essentially of Te and additionally containing Cr, c and H and said substrate being composed of a cycloolefin random copolymer of ethylene and cycloolefin unit represented by the following general formula [I].

The second optical recording medium of the present invention comprises a substrate and a recording layer formed thereon, in which the recording layer is irradiated with beam of energy to form thereon pits corresponding to given pieces of information and thereby record the pieces of information, said recording layer being a thin film consisting essentially of Te and additionally containing Cr, C and H and said substrate being formed a cycloolefin random copolymer composition comprising

[A] A cycloolefin random copolymer containing an ethylene unit and a cycloolefin unit derived from the following general formula [I] and having an intrinsic viscosity [η] of from 0.05 to 10 dl/g as measured at 135° C. in decalin and a softening temperature (TMA) of not lower than 70° C., and

[B] a cycloolefin random copolymer containing an ethylene unit and a cycloolefin unit derived from the following general formula [I] and having an intrinsic viscosity [η] of from 0.05 to 5 dl/g as measured at 135° C.in decalin and a softening temperature (TMA) of below 70° C., in such a proportion that the ratio by weight of said component [A] to said component [B] is in the range of from 100/0.1 to 100/10.

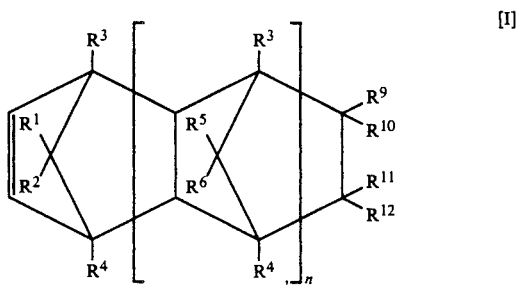

In the general formula [I], n is 0 or a positive integer, and R$^1$ to R$^{12}$ are the same or different and each represents a hydrogen atom, a halogen atom or a hydrocarbon group, provided that $R^9$ to $R^{12}$, when taken together, may form a mono- or poly-cyclic hydrocarbon ring which may optionally have double bond or bonds, or $R^9$ and $R^{10}$ or $R^{11}$ and $R^{12}$, when taken together, may form an alkylidene group.

In the polymer chain of the random copolymer, the unit derived from the cycloolefins of the general formula [I] is present in the form of a recurring unit as represented by the following general formula [II].

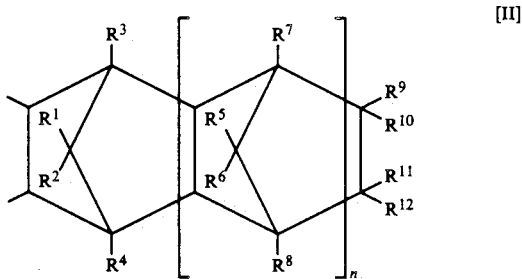

[II]

wherein $R^1$ to $R^{12}$ and n are as defined above.

BRIEF DESCRIPTION OF THE DRAWINGS

FIG. 1 is a rough sectional view of one embodiment of the optical recording medium of the present invention.

FIG. 4 is a rough sectional view of another embodiment of the optical recording medium of the present invention.

Figure 2:
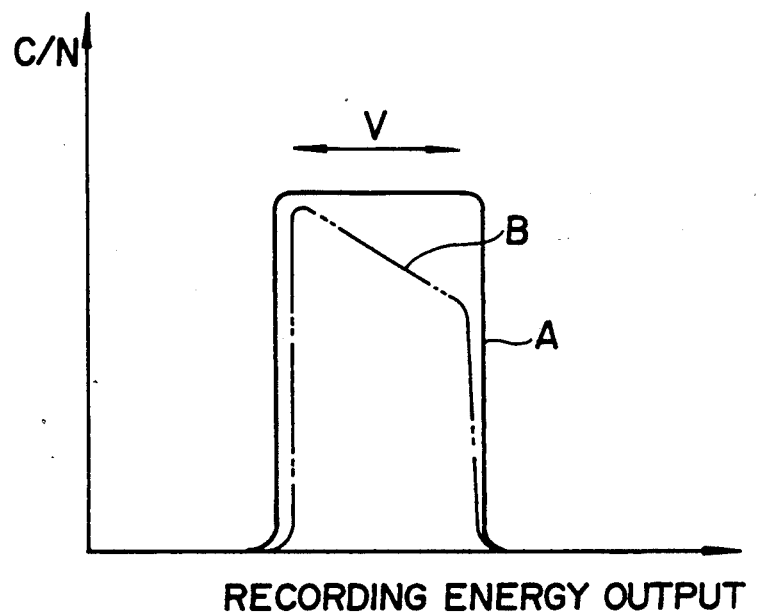
FIG. 2 and FIG. 3 show differences of functions and effects between the optical recording media of this invention and conventional ones.

In the Figures, numeral 10 represents optical recording medium, 11 represents substrate, 12 represents recording layer and 13 represents undercoat layer.

DETAILED DESCRIPTION OF THE INVENTION

The optical recording media of the present invention will be illustrated in more detail below.

As shown in FIG. 1, an optical recording medium 10 according to the present invention comprises a substrate 11 and a recording layer 12 formed thereon.

Substrate

In the first optical recording medium 10 of the present invention, the substrate 11 is composed of a cycloolefin random copolymer of ethylene and at least one cycloolefin unit represented by the following general formula [I] and having an intrinsic viscosity [η] of from 0.05 to 10 dl/g as measured at 135° C. in decalin.

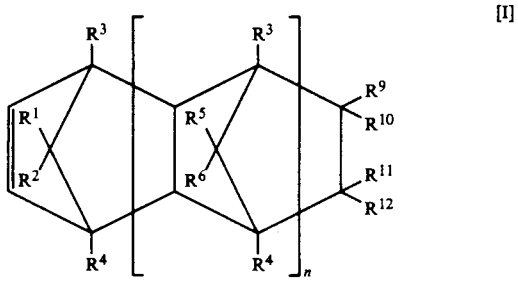

[I]

wherein n is 0 or a positive integer, preferably not more than 3, $R^1$ to $R^{12}$ are the same or different, and each represents a hydrogen atom, a halogen atom or a hydrocarbon group, provided $R^9$ to $R^{12}$, when combined together, may form a mono- or poly-cyclic hydrocarbon ring which may optionally have double bond or bonds, or $R^9$ and $R^{10}$ or $R^{11}$ and $R^{12}$, when taken together, may form an alkylidene group.

In the second optical recording medium 10 of the present invention, said substrate 11 is composed of a cycloolefin random copolymer composition comprising

[A] a cycloolefin random copolymer composed of an ethylene unit and a cycloolefin unit derived from the formula [I]and having an intrinsic viscosity [η] of from 0.05 to 10 dl/g as measured at 135° C. in decalin and a softening temperature (TMA) of not lower than 70° C., and

[B] a cycloolefin random copolymer composed of ethylene unit and a cycloolefin unit derived from the formula [I] and having an intrinsic viscosity [η] of from 0.05 to 5 dl/g as measured at 135° C., in decalin and a softening temperature (TMA) of below 70° C., in such a proportion that the ratio by weight of said component [A] to said component [B] is in the range of from 100/0.1 to 100/10.

When the component [A] i.e. copolymer [A] is further blended with the component [B] i.e. copolymer [B] in the ratio specified above, there is a possibility that the adhesion between the substrate 11 and the recording layer 12 is further improved as compared with the case where the recording layer 12 is laminated onto the substrate 11 composed of the component [A]alone.

The cycloolefin used herein include, for example the following unsaturated monomers represented by the general formula [I].

The cycloolefins represented by the general formula [I] can be easily prepared by condensation reaction of cyclopentadienes with appropriate olefins by Diels-Alder reaction.

Examples of the cycloolefins represented by the general formula [I] include such compounds as exemplified in Table 1 and derivatives thereof, and in addition to 1,4,5,8-dimethano-1,2,3,4,4a,5,8,8a-octahydronaphthalene, such octahydronaphthalenes as 2-methyl-1,4,5,8-dimethano-1,2,3,4,4a,5,8,8a-octahydronaphthalene, 2-ethyl-1,4,5,8-dimethano-1,2,3,4,4a,5,8,8aoctahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-stearyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8dimethano-1,2,3,4,4a,5,8,8a-octahydronaphthalene, 2-bromo-1,4,5,8-dimethano-1,2,3,4,4a,5,8,8a-octahydronaphthalene, 2fluoro-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-cyclohexyl-1,4,5,8dimethano-1,2,3,4,4a,5,8,8a-octahydronaphthalene, 2n-butyl-1,4,5,8-dimethano-1,2,3,4,4a,5,8,8a-octahydronaphthalene and 2-isobutyl-1,4,5,8dimethano-1,2,3,4,4a,5,8,8,a-octahydronaphthalene.

TABLE 1

| Chemical formula | Compound name |
|---|---|
| | Bicyclo[2,2,1]hept-2-ene |
| —CH$_3$ | 6-Methylbicyclo[2,2,1]hept-ene |
| —CH$_3$, —CH$_3$ | 5,6-Dimethylbicyclo[2,2,1]hept-2-ene |
| CH$_3$ | 1-Methylbicyclo[2,2,1]hept-2-ene |
| —C$_2$H$_5$ | 6-Ethylbicyclo[2,2,1]hept-2-ene |
| —nC$_4$H$_9$ | 6-Butylbicyclo[2,2,1]hept-2-ene |
| —iC$_4$H$_9$ | 6-Isobutylbicyclo[2,2,1]hept-2-ene |
| CH$_3$ | 7-Methylbicyclo[2,2,1]hept-2-ene |
| | Tetracyclo[4,4,0,1$^{2.5}$,1$^{7.10}$]-3-dodecene |
| CH$_3$ | 8-Methyltetracyclo[4,4,0, 1$^{2.5}$,1$^{7.10}$]-3-dodecene |
| C$_2$H$_5$ | 8-Ethyltetracyclo[4,4,0, 1$^{2.5}$,1$^{7.10}$]-3-dodecene |
| —C$_3$H$_7$ | 8-Propyltetracyclo[4,4,0, 1$^{2.5}$,1$^{7.10}$]-3-dodecene |
| C$_6$H$_{13}$ | 8-Hexyltetracyclo[4,4,0, 1$^{2.5}$,1$^{7.10}$]-3-dodecene |

TABLE 1-continued

| Chemical formula | Compound name |
|---|---|
| 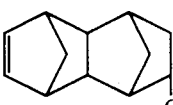 | 8-Stearyltetracyclo[4,4,0, $1^{2.5},1^{7.10}$]-3-dodecene |
| 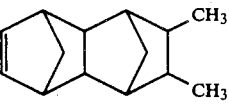 | 8,9-Dimethyltetracyclo[4,4,0, $1^{2.5},1^{7.10}$]-3-dodecene |
| 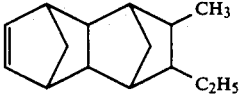 | 8-Methyl-9-ethyltetracyclo[4,4,0 $1^{2.5},1^{7.10}$]-3-dodecene |
|  | 8-Chlorotetracyclo[4,4,0, $1^{2.5},1^{7.10}$]-3-dodecene |
|  | 8-Bromotetracyclo[4,4,0, $1^{2.5},1^{7.10}$]-3-dodecene |
| 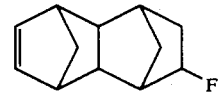 | 8-Fluorotetracyclo[4,4,0, $1^{2.5},1^{7.10}$]-3-dodecene |
| 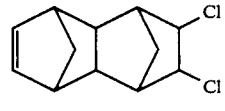 | 8,9-Dichlorotetracyclo[4,4,0, $1^{2.5},1^{7.10}$]-3-dodecene |
|  | 8-Cyclohexyltetracyclo[4,4,0, $1^{2.5},1^{7.10}$]-3-dodecene |
| 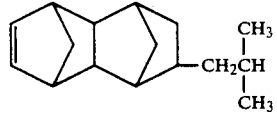 | 8-Isobutyltetracyclo[4,4,0, $1^{2.5},1^{7.10}$]-3-dodecene |
| 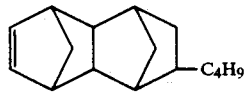 | 8-Butyltetracyclo[4,4,0, $1^{2.5},1^{7.10}$]-3-dodecene |
| 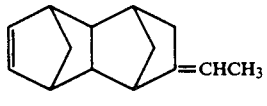 | 8-Ethylidenetetracyclo[4,4,0, $1^{2.5},1^{7.10}$]-3-dodecene |
| 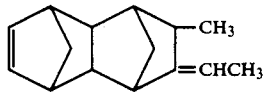 | 8-Ethylidene-9-methyltetracyclo [4,4,0,$1^{2.5},1^{7.10}$]-3-dodecene |
| 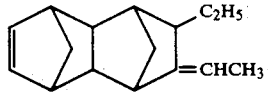 | 8-Ethylidene-9-ethyltetracyclo [4,4,0,$1^{2.5},1^{7.10}$]-3-dodecene |

TABLE 1-continued

| Chemical formula | Compound name |
|---|---|
| 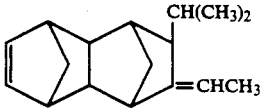 | 8-Ethylidene-9-isopropyltetracyclo [4,4,0,1$^{2.5}$,1$^{7.10}$]-3-dodecene |
| 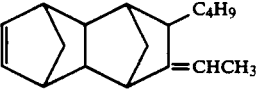 | 8-Ethylidene-9-butyltetracyclo [4,4,0,1$^{2.5}$,1$^{7.10}$]-3-dodecene |
| 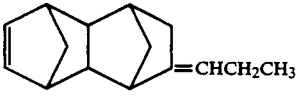 | 8-n-Propylidenetetracyclo [4,4,0,1$^{2.5}$,1$^{7.10}$]-3-dodecene |
| 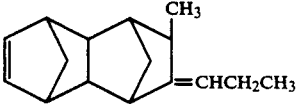 | 8-n-Propylidene-9-methyltetracyclo [4,4,0,1$^{2.5}$,1$^{7.10}$]-3-dodecene |
| 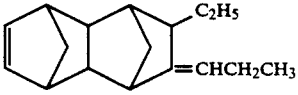 | 8-n-Propylidene-9-ethyltetracyclo [4,4,0,1$^{2.5}$,1$^{7.10}$]-3-dodecene |
| 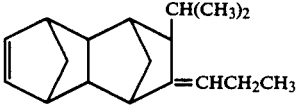 | 8-n-Propylidene-9-isopropyltetracyclo- [4,4,0,1$^{2.5}$,1$^{7.10}$]-3-dodecene |
| 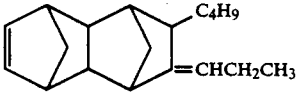 | 8-n-Propylidene-9-butyltetracyclo [4,4,0,1$^{2.5}$,1$^{7.10}$]-3-dodecene |
| 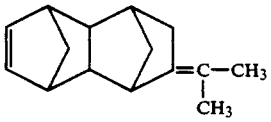 | 8-Isopropylidenetetracyclo [4,4,0,1$^{2.5}$,1$^{7.10}$]-3-dodecene |
| 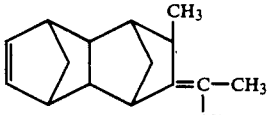 | 8-Isopropylidene-9-methyltetracyclo [4,4,0,1$^{2.5}$,1$^{7.10}$]-3-dodecene |
| 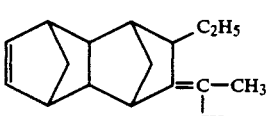 | 8-Isopropylidene-9-ethyltetracyclo [4,4,0,1$^{2.5}$,1$^{7.10}$]-3-dodecene |
| 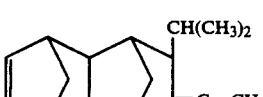 | 8-Isopropylidene-9-isopropyltetracyclo[4,4,0,1$^{2.5}$,1$^{2.5}$,1$^{7.10}$]-3-dodecene |
|  | 8-Isopropylidene-9-butyltetracyclo [4,4,0,1$^{2.5}$,1$^{7.10}$]-3-dodecene |

TABLE 1-continued

| Chemical formula | Compound name |
|---|---|
| [structure with two CH3 groups] | 5,10-Dimethyltetracyclo[4,4,0,1$^{2.5}$,1$^{7.10}$]-3-dodecene |
| [structure with two CH3 groups] | 2,10-Dimethyltetracyclo-[4,4,0,1$^{2.5}$,1$^{7.10}$]-3-dodecene |
| [structure with two CH3 groups] | 11,12-Dimethyltetracyclo-[4,4,0,1$^{2.5}$,1$^{7.10}$]-3-dodecene |
| [structure with three CH3 groups] | 2,7,9-Trimethyltetracyclo-[4,4,0,1$^{2.5}$,1$^{7.10}$]-3-dodecene |
| [structure with CH3, C2H5, CH3] | 9-Ethyl-2,7-dimethyltetracyclo-[4,4,0,1$^{2.5}$,1$^{7.10}$]-3-dodecene |
| [structure with CH3, isobutyl, CH3] | 9-Isobutyl-2,7-dimethyltetracyclo-[4,4,0,1$^{2.5}$,1$^{7.10}$]-3-dodecene |
| [structure with three CH3 groups] | 9,11,12-Trimethyltetracyclo-[4,4,0,1$^{2.5}$,1$^{7.10}$]-3-dodecene |
| [structure with CH3, CH3, C2H5] | 9-Ethyl-11,12-dimethyltetracyclo-[4,4,0,1$^{2.5}$,1$^{7.10}$]-3-dodecene |
| [structure with CH3, CH3, isobutyl] | 9-Isobutyl-11,12-dimethyltetracyclo-[4,4,0,1$^{2.5}$,1$^{7.10}$]-3-dodecene |
| [structure with four CH3 groups] | 5,8,9,10-Tetramethyltetracyclo-[4,4,0,1$^{2.5}$,1$^{7.10}$]-3-dodecene |

TABLE 1-continued

| Chemical formula | Compound name |
|---|---|
|  | Hexacyclo[6,6,1,1$^{3.6}$,1$^{10.13}$,0$^{2.7}$,0$^{9.14}$]-4-heptadecene |
|  | 12-Methylhexacyclo[6,6,1,1$^{3.6}$, 1$^{10.13}$,0$^{2.7}$,0$^{9.14}$]-4-*heptadecene* |
|  | 12-Ethylhexacyclo[6,6,1,1$^{3.6}$, 1$^{10.13}$,0$^{2.7}$,0$^{9.14}$]-4-heptadecene |
|  | 12-Isobutylhexacyclo[6,6,1,1$^{3.6}$, 1$^{10.13}$,0$^{2.7}$,0$^{9.14}$]-4-*heptadecene* |
|  | 1,6,10-Trimethyl-12-isobutyl-hexacyclo[6,6,1,1$^{3.6}$,1$^{10.13}$,0$^{2.7}$,0$^{9.14}$]-4-heptadecene |
|  | Octacyclo[8,8,0,1$^{2.9}$,1$^{4.7}$,1,1$^{11.18}$, 1$^{13.16}$,0$^{3.8}$,0$^{12.17}$]-5-docosen |
|  | 15-Methyloctacyclo[8,8,0,1$^{2.9}$,1$^{4.7}$, 1,1$^{11.18}$,1$^{13.16}$,0$^{3.8}$,0$^{12.17}$]-5-docosen |
|  | 15-Ethyloctacyclo[8,8,0,1$^{2.9}$,1$^{4.7}$, 1,1$^{11.18}$,1$^{13.16}$,0$^{3.8}$,0$^{12.17}$]-5-docosen |
|  | Pentacyclo[6,6,1,1$^{3.6}$,0$^{2.7}$,0$^{9.14}$]-4-hexadecene |
|  | 1,3-Dimethylpentacyclo[6,6,1, 1$^{3.6}$,0$^{2.7}$,0$^{9.14}$]-4-hexadecene |
|  | 1,6-Dimethylpentacyclo[6,6,1, 1$^{3.6}$,0$^{2.7}$,0$^{9.14}$]-4-hexadecene |
|  | 15,16-Dimethylpentacyclo[6,6,1, 1$^{3.6}$,0$^{2.7}$,0$^{9.14}$]-4-hexadecene |

TABLE 1-continued

| Chemical formula | Compound name |
|---|---|
| | Pentacyclo[6,5,1,1$^{3.6}$, 0$^{2.7}$,0$^{9.13}$]-4-pentadecene |
| | 1,3-Dimethylpentacyclo[6,5,1,1$^{3.6}$, 0$^{2.7}$,0$^{9.13}$]-4-pentadecene |
| | 1,6-Dimethylpentacyclo[6,5,1,1$^{3.6}$, 0$^{2.7}$,0$^{9.13}$]-4-pentadecene |
| | 14,15-Dimethylpentacyclo[6,5,1,1$^{3.6}$, 0$^{2.7}$,0$^{9.13}$]-4-pentadecene |
| | Heptacyclo[8,7,0,1$^{2.9}$,1$^{4.7}$,1$^{11.17}$, 0$^{3.8}$,0$^{12.16}$]-5-icosene |
| | Heptacyclo[8,8,0,1$^{2.9}$,1$^{4.7}$,1$^{11.18}$, 0$^{3.8}$,0$^{12.17}$]-5-henicosene |
| | Pentacyclo[6,5,1,1$^{3.6}$, 0$^{2.7}$,0$^{9.13}$]-4,10-pentadecadiene |
| | Tricyclo[4,3,0,1$^{2.5}$]-3-decene |
| | 2-Methyl-tricyclo[4,3,0,1$^{2.5}$]-3-decene |
| | 5-Methyl-tricyclo[4,3,0,1$^{2.5}$]-3-decene |
| | Tricyclo[4,4,0,1$^{2.5}$]-3-undecene |
| | 10-Methyl-tricyclo[4,4,0,1$^{2.5}$]-3-undecene |

TABLE 1-continued

| Chemical formula | Compound name |
|---|---|
| 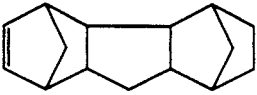 | Pentacyclo[4,7,0,1$^{2.5}$,0$^{8.13}$,1$^{9.12}$]-3-pentadecene |
| 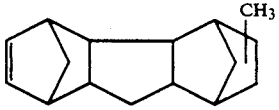 | Methyl-substituted pentacyclo [4,7,0,1$^{2.5}$,0$^{8.13}$,1$^{9.12}$]-3-pentadecene |
|  | Heptacyclo[7,8,0,1$^{3.6}$,0$^{2.7}$,1$^{10,17}$, 0$^{11.16}$,1$^{12.15}$]-4-icosene |
| 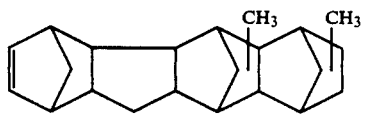 | Dimethyl-substituted heptacyclo [7,8,0,1$^{3.6}$,0$^{2.7}$,1$^{10,17}$,0$^{11.16}$,1$^{12.15}$]-4-icosene |
| 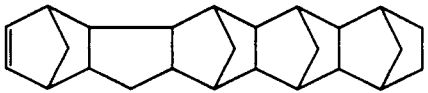 | Nonacyclo[9,10,1,1$^{4.7}$,0$^{3.8}$,0$^{2.10}$,0$^{12.21}$, 1$^{13.20}$,0$^{14.19}$,1$^{15.18}$]-5-pentacosene |
| 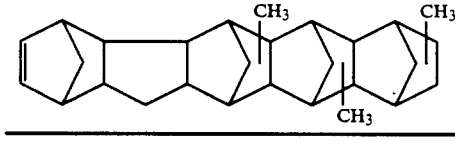 | Trimethyl-substituted nonacyclo [9,10,1,1$^{4.7}$,0$^{3.8}$,0$^{2.10}$,0$^{12.21}$,1$^{13.20}$, 0$^{14.19}$,1$^{15.18}$]-5-pentacosene |

The cycloolefin random copolymer contains as essential components the ethylene unit and the cycloolefin unit as described above. In addition to said two essential units, however, the cycloolefin random copolymer may optionally contain other copolymerizable unsaturated monomer units in such a range that they do not hinder the object of the present invention. Such unsaturated monomers which may optionally be copolymerized in the concrete are α-olefins having from 3 to 30 carbon atoms, such as propylene, 1-butene, 4-methyl-1-pentene, 1-hexene, 1-octene, 1-decene, 1-dodecene, 1-tetradecene, 1-hexadecene, 1-octadecene 1-eicosene, etc.

In the cycloolefin random copolymer which constitutes the substrate of the first optical recording medium of the present invention, the recurring units (a) derived from ethylene are present in an amount of from 40 to 85% by mole, preferably from 50 to 75% by mole, while the recurring units (b) derived from the cycloolefin or cycloolefins are present in an amount of from 15 to 60% by mole, preferably from 25 to 50% by mole, and these recurring units (a) and (b) are arranged at random in the substantially linear chain of the copolymer. The molar percentage of the recurring units (a) and (b) were determined by $^{13}$C-NMR. The fact that the copolymer is completely soluble in decalin at a temperature of 135° C., indicates that the chemical structure of said copolymer is substantially linear and free from a gel-forming cross-linked structure.

The copolymer has an intrinsic viscosity [η] of from 0.05 to 10 dl/g, preferably from 0.08 to 5 dl/g, as measured in decalin at a temperature of 135° C.

The softening temperature (TMA) of the copolymer, as measured by a thermal mechanical analyzer is desirably at least 70° C., preferably from 90° to 250° C., and more preferably from 100° to 200° C.

The softening temperature (TMA) of the copolymer [A] was determined by monitoring thermal deformation behavior of a 1 mm sheet of the copolymer using a thermomechanical analyzer supplied by Du Pont. More specifically, a quartz needle was vertically placed on the sheet under a load of 49 g and the assembly was heated at a rate of 5° C./min. The temperature at which the needle penetrated into the sheet by a depth of 0.635 mm was taken as the softening temperature of the copolymer.

The copolymer has a glass transition temperature (Tg) of normally from 50° to 230° C., and preferably from 70° to 210° C.

The crystallinity of the copolymer, as measured by X-ray diffractometry, is normally from 0 to 10%, preferably from 0 to 7%, and more preferably from 0 to 5%.

The second optical recording medium will be illustrated in more detail hereinafter.

In the cycloolefin random copolymer [A] having a softening temperature (TMA) of not lower than 70° C., contained in the cycloolefin random copolymer composition which constitutes the substrate of the second optical recording medium of the present invention, the recurring units (a) derived from ethylene are present in an amount of from 40 to 85 mol %, preferably from 50 to 75 mol%, while the recurring units (b) derived from the cycloolefin or cycloolefins are present in an amount of from 15 to 60 mol%, preferably 25 to 50 mol%, and these recurring units (a) and (b) are arranged at random in the substantially linear chain of the copolymer [A]. The molar percentage of the recurring units (a) and (b) were determined by $^{13}$C-NMR. The fact that the copolymer [A] is completely soluble in decalin at a temperature of 135° C., indicates that the chemical structure of said copolymer is substantially linear and free from a gel-forming crosslinked structure.

An intrinsic viscosity [η] as measured at 135° C. in decalin of the cycloolefin random copolymer [A] is in the range of from 0.05 to 10 dl/g, preferably from 0.08 to 5 dl/g.

A softening temperature (TMA) as measured with a thermal mechanical analyzer of the cycloolefin random copolymer [A] is not lower than 70° C., preferably in the range of from 90° to 250° C., more preferably from 100° to 200° C. Furthermore, a glass transition temperature (Tg) of said cycloolefin random copolymer [A] is usually in the range of from 50° to 230° C., preferably from 70° to 210° C.

A crystallinity index as measured by X-ray diffractometry of the cycloolefin random copolymer [A] is in the range of from 0 to 10%, preferably from 0 to 7%, more preferably from 0 to 5%.

In the cycloolefin random copolymer [B] having a softening temperature of below 70° C., contained in the cycloolefin random copolymer composition which constitutes the substrate of the second optical recording medium of the present invention, the recurring units (a) derived from ethylene are present in an amount of from 60 to 98 mol %, preferably 60 to 95 mol %, while the recurring unit (b) derived from the cycloolefin or cycloolefins are present in an amount of from 2 to 40 mol %, preferably 5 to 40 mol %, and these recurring units (a) and (b) are arranged at random in the substantially linear chain of the copolymer [B]. The molar percentage of the recurring units (a) and (b) were determined by $^{13}$C-NMR. The fact that the copolymer [B] is completely soluble in decalin at a temperature of 135° C., indicates that the chemical structure of said copolymer is substantially linear and free from a gel-forming crosslinked structure.

The copolymer [B] has an intrinsic viscosity [η] of from 0.05 to 5 dl/g, preferably from 0.08 to 3 dl/g as measured in decalin at a temperature of 135° C.

The softening temperature of the copolymer [B] as measured by a thermal mechanical analyzer is below 70° C., preferably from −10° to 60° C., more preferably from 10 to 55° C. The copolymer [B] has a glass transition temperature (Tg) of normally from −30° to 60° C., preferably from −20° to 50° C.

The crystallinity of the copolymer [B] as measured by X-ray diffractometry, is normally from 0 to 10%, preferably from 0 to 7%, and more preferably from 0 to 5%.

The ratio by weight of the copolymer [A] to the copolymer [B] in the cycloolefin random copolymer composition to be used as the substrate of the second optical recording medium of the present invention is in the range of from 100/0.1 to 100/10, preferably 100/0.3 to 100/7, and more preferably 100/0.5 to 100/5. When the copolymer [A] is blended with the copolymer [B] in the ratio defined above, there can be obtained an improved adhesion between the substrate and the recording layer under sever conditions while retaining the excellent transparency and surface smoothness of the substrate itself. Further, the substrate composed of the cycloolefin random copolymer composition comprising the copolymer [A] and the copolymer [B] has such an advantage that the excellent adhesion between the substrate and the recording layer used in the present invention is not deteriorated even when the media are left to stand under high temperature and humidity conditions.

The cycloolefin random and copolymer and the cycloolefin random copolymers [A] and [B] of the cycloolefin random copolymer composition which constitute the substrate of the present invention may be prepared by suitably selecting the conditions under which they are prepared in accordance with the processes as proposed by the present applicant in Japanese Pat. L-O-P Publns. Nos. 168708/1985, 120816/1986, 115912/1986, 115916/1986, 95905/1986, 95906/1986, 271308/1986 and 272216/1986.

Furthermore, the substrates of the optical discs according to the invention may be made of polymers having recurring units of the general formula [III] resulting from ring opening of the cycloolefin monomers [I], or polymers having recurring units of the general formula [IV] resulting from hydrogenation of the units [III].

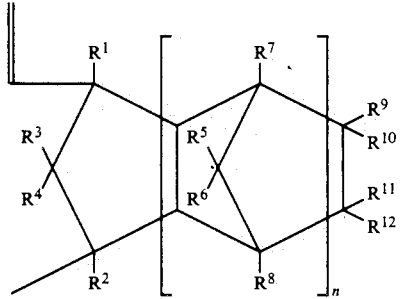

[III]

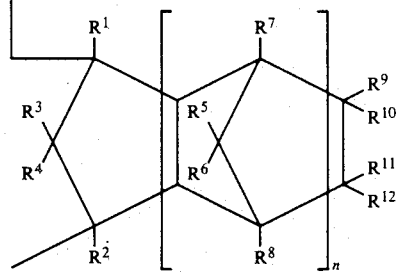

[IV]

In the general formula [III] or [IV], n and $R^1$ to $R^{12}$ are as defined above.

The cycloolefin random copolymer or the cycloolefin random copolymer compositions may be incorporated with heat stabilizers, weathering stabilizers, antistatic agents, slip agents, anti-blocking agents, anti-fogging agents, lubricants, dyes, pigments, natural oil, snythetic oil, wax, etc., and the amounts of these additives may be suitably decided. For instance, the stabilizers which may be optionally incorporated include concretely phenolic antioxidants such as tetrakis[methylene-3-(3,5di-t-butyl-4-hydroxyphenyl)propionate]methane, alkyl esters of β-(3,5-di-t-butyl-4-hydroxyphenyl)propionic acid (18C or lower alkyl esters being particularly preferred), 2,2′-oxamidobis[ethyl-3-(3,5-di-t-butyl-4-hydroxyphenyl)]propionate, etc., metallic salts of fatty acids, such as zinc stearate, calcium stearate, calcium 12-hydroxystearate, etc., and fatty esters of polyhydric alcohols such as glycerin monostearate, glycerin monolaurate, glycerin distearate, pentaerythritol distearate pentaerythritol tristearate, etc. These compounds may be incorporated into the copolymers or the copolymer compositions either singly or in combination. For instance, there may be used such a combination of tetrakis[methylene-3-(3,5-di-t-butyl-4-hydroxyphenyl)propionate]methane with zinc stearate and glycerin monostearate, and the like combinations.

In the present invention, it is preferred to use combinations of phenolic antioxidants with fatty esters of polyhydric alcohols. It is preferred that the fatty esters of the polyhydric alcohols are those wherein part of alcoholic hydroxyl groups of trihydric or polyhydric alcohols are esterified.

Examples of such fatty esters of polyhydric alcohols include concretely fatty esters of glycerin such as glycerin monostearate, glycerin monolaurate, glycerin monomyristate, glycerin monopalmitate, glycerin distearate, glycerin dilaurate, etc., and fatty esters of pentaerythritol such as pentaerythritol monostearate, pentaerythritol monolaurate, pentaerythritol distearate, pentaerythritol dilaurate, pentaerythritol tristearate, etc.

The phenolic antioxidants are used in an amount of 0.01 to 10 parts by weight, preferably 0.05 to 3 parts by weight, more preferably 0.1 to 1 part by weight based on the amount of the cycloolefin random copolymer or the cycloolefin random copolymer composition. The fatty ester of the polyhydric alcohols are used in an amount of 0.01 to 10 parts by weight, preferably 0.05 to 3 parts by weight based on the amount of the cycloolefin random copolymer or the cycloolefin random copolymer composition.

In the optical recording media of the present invention, the cycloolefin random copolymers or the cycloolefin random copolymer compositions are used as the substrates 11. The optical recording media of the present invention are superior in recording sensitivity to conventional optical recording media in which polycarbonates or poly(methyl methacrylate) are used as the substrate, though the reasons for the unexpected results so far are not known.

The substrates 11 composed of the cycloolefin random copolymers or the cycloolefin random copolymer compositions are excellent in adhesion to the recording layer 12. Accordingly, the recording layer is excellent in long-term stability and can be effectively prevented from being oxidized.

Accordingly, the optical recording media comprising the substrates 11 composed of the cycloolefin random copolymers or the cycloolefin random copolymer compositions and the recording layer 12 laminated thereon are excellent in recording sensitivity as well as in durability and long-term stability. Further, the optical recording media 10 of the present invention cause neither warpage nor cracking.

Recording layer

The recording layer 12 of the present invention is a thin film consisting essentially of Te and additionally containing at least Cr, C and H. The recording layer may contain low melting elements other than Te or other components. Elements other than Te, which can be incorporated in the recording layer 12, include, for example, Ti, Mn, Ni, Zr, Nb, Ta, Al, Pt, Sb, Ge, Ag, Sm, Bi, In, Se, Pb, Co, Si, Pd, Sn, Zn and the like.

The contents of Cr in the recording layer 12 is from 0.1 to 40 atom %, preferably from 0.5 to 10 atom %, especially preferably from 1 to 4 atom % based on the total atoms present in the recording layer, or from 0.1 to 40 atom %, preferably from 0.5 to 10 atom %, especially preferably from 1 to 4 atom % based on the sum of total Te and Cr atoms present in the recording layer. By incorporating Cr atom in the above-mentioned ranges into the recording layer, it becomes possible to improve the oxidation resistance of said recording layer 12 without lowering the recording sensitivity or, in some cases, with increased recording sensitivity.

From the standpoint of improving recording sensitivity and duration of life of the recording layer, it is desirable that the contents of c in the recording layer 12 is less than 40 atom %, preferably from 3 to 20 atom % based on the total atoms present in the recording layer, or less than 40 atom %, preferably from 3 to 20 atom % based on the sum total of Te, Cr and C atoms present in the recording layer. By incorporating C atom in the above-mentioned ranges into the recording layer, it becomes possible to improve the recording sensitivity and recording margin of recording layer.

From the standpoint of improving duration of life, it is desirable that the content of H in the recording layer 12 is from 1 to 40 atom %, preferably from 3 to 25 atom % based on the total atom present in the recording layer.

The amounts of elements contained in the recording layer 12, for example, metallic elements such as Te and Cr are determined by ICP emission spectroscopic analysis (induced coupled plasma emission spectrometry). The amount of C is determined by X-ray photoelectron spectrometry (ESCA) and the amount of H is determined by organic elementary analysis.

In recording information to the recording layer 12 having such a composition as mentioned above, the desired recording of given pieces of information may be accomplished by irradiating the recording layer with beam of energy such as a laser beam modulated (on or off) according to the piece of information to be recorded and forming the corresponding pits on the irradiated portions of the recording layer. The pits may be those physically deformed such as holes or concavities, or may be such portions of the recording layer in which optical properties such as refractive index and reflectance have been changed by the irradiation with beam of energy.

The recording layer 12 as mentioned above must be large in thickness to such an extent that sufficient light reflectance is obtained thereby and at the same time, it must be small in thickness to such an extent that no sensitivity is marred thereby. To be concrete, when physically deformed portions such as holes are formed in the recording layer 12, a film thickness of the recording layer is from about 100 Å to 1 μm, preferably 100 to 5000 Å and more preferably 150 to 700 Å. When portions in which optical properties such as refractive index or reflectance have been changed are formed in the recording layer 12, a film thickness of the recording layer is from about 100 Å to 1 μm, preferably 100 to 5000 Å and more preferably 200 to 2000 Å.

The recording layer 12 may be formed on the substrate 11, for example, by the following procedure.

the recording layer 12 composed of a thin Te-Cr alloy film containing C and H can be formed on the substrate 11 by using Te-Cr alloy as a target or Te and Cr respectively arranged target applying magnetron sputtering in a mixed gas of an organic gas containing C and H such as $CH_4$ or $C_2H_2$ gas and Ar gas. The recording layer 12 composed of a thin Te-Cr alloy film containing C and H can also be formed on the substrate 11 by depositing a vapor of $CH_4$, Te and Cr in the form of plasma without using sputtering. The recording layer 12 can also be formed on the substrate 11 by vapor phase growth or plasma vapor phase growth. Further, other methods can also be used, for example, part or all of Te, Cr, C and H atoms is ionized to beam-like state and allowed to accumlate on the substrate.

The atomic content ratio of Te to Cr of the recording layer 12 composed of a thin Te-Cr alloy film containing C and H can be freely controlled by controlling the voltage applied to Te and Cr separately in the case of sputtering Te and Cr simultaneously, and by altering the alloy composition in the case of using an alloy target.

The contents of C and H in the recording layer 12 composed of a thin Te-Cr alloy film can be arbitrarily controlled by the mixing ratio of $CH_4$ and Ar or applied power preferably high frequency. The most suitable content of H in the recording layer will be determined depending on the content of C. The content of H can be arbitrarily chosen, so long as the content of H in the recording layer is not so high that hydrogen gas ($H_2$)evolves. Further, since the film thickness is in proportion to sputtering time, the 'film thickness' can be easily controlled.

The optical characteristics such as refractive index and extinction coefficient of the thus-formed recording layer 12 composed of a thin te-Cr alloy film containing C and H vary depending on the contents of C and H. Accordingly, the film thickness is determined according to the required optical characteristics when the recording layer is used for the recording of information.

The recording layer 12 as illustrated above has been markedly improved in oxidation resistance and recording sensitivity in comparison with recording layer formed by using a low melting metal alone such as Te alone.

For instance, it has been confirmed by experiment that when the recording layer consisting essentially of Te and additionally containing Cr, C and H is stored under high temperature and humidity conditions over a long period of time, a variation in reflectance of the recording layer becomes smaller with an increase in the content of Cr and thus the recording layer of the present invention is improved in oxidation resistance in comparison with the recording layer composed of Te alone.

Further, it has been confirmed by experiment that the recording layer of the present invention requires a relatively small recording energy output and has an improved recording sensitivity.

Figure 3:
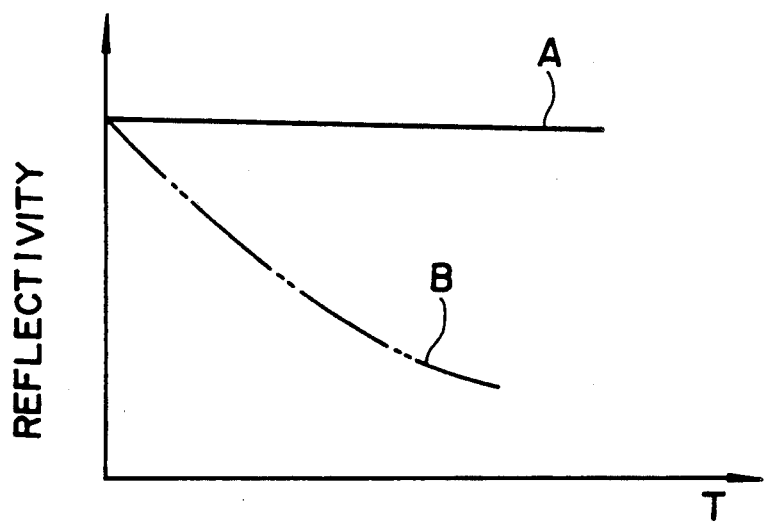

Further, as shown in a curve A in FIG. 2, the optical recording media of this invention shows almost no change in the C/N ratio during reproducing against minute voltage variation of a recording energy output, and has a wide recording margin, compared with conventional optical recording media comprising a Te recording layer containing C and H as shown in a curve B in FIG. 2. In addition the optical recording media of this invention shows almost no change in reflectance with the elapse of time as shown in curve A in FIG. 3 compared with conventional optical recording media comprising a Te recording layer containing C and H as shown in a curve B in FIG. 3. Such improvement will become clear in Table 3 described hereinafter.

In the present invention, after forming the recording layer 12 on the substrate 11 in the manner as mentioned above, the recording layer 12 alone or together with the substrate 11 may be heat-treated in a gas atmosphere containing inert gas, reducing gas or oxygen. The heat treatment temperature must be lower than the melting point of Te contained in the recording layer, and is preferably 70° to 300° C., particularly 90° to 150° C. The heating time is at least 5 seconds, preferably from 5 seconds to 10 hours, more preferably from 5 minutes to 2 hours.

By virtue of the heat treatment of the recording layer 12 alone or together with the substrate 11 after the formation of said layer on the substrate 11 in the manner described above, the recording sensitivity in the recording layer is improved and recording margin is enlarged. This is thought to be due to the fact that the recording layer is crystallized to a certain extent by heat treatment.

The present invention is not limited to the embodiment shown in FIG. 1, but it should be construed that variations and modifications can be effected within the spirit and scope of the invention.

For instance, an undercoat layer 13 may be provided between the substrate 11 and the recording layer 12 as shown in FIG. 4. The undercoat layer includes, for example, films of fluorides such as magnesium fluoride ($MgF_2$), films of silicon compounds such as silicon oxide ($SiO_2$, SiO) or silicon nitride ($Si_3N_4$), metallic films composed of ti, Ni, Cr, Al or Ni-Cr, films of fluorine-substituted hydrocarbon compounds such as polytetrafluoroethylene (PTFE) film and/or polymer films thereof, and Cr-C-H-films (films containing Cr, C and H). The undercoat layer generally has a film thickness of from 10 to 1000 Å, preferably from 50 to 500 Å, though the film thickness may vary according to the material used for the undercoat layer. By virtue of the film thickness as present above, these undercoat layers exemplified above can maintain their transparency and, at the same time, can exhibit various characteristics as the undercoat layer.

The undercoat layer 13 as mentioned above may be formed on the surface of the substrate 11 in the same manner as in the case of formation of the recording layer 12 by the magnetron sputtering, vapor phase growth, plasma vapor phase growth, vacuum evaporation or spincoat process.

Provision of the above-mentioned undercoat layer between the substrate 11 and the recording layer 12 results in a further improvement in recording sensitivity and a further enlargement of the recording margin thereof under certain circumstances.

The optical recording media obtained by laminating the recording layer 12 onto the substrate 11 in the manner described above are excellent in recording sensitivity in particular and have sometimes the enlarged recording margin.

According to the present invention, moreover, a surface layer may be formed on the surface of the recording layer 12 of the optical recording medium 10 as shown in FIGs. 1 and 4. The material used for forming the surface layer includes elements used for the recording layer and oxides, nitrides and metals of Si, Ti and the like. The surface layer has a film thickness of from 5 to 100 Å, preferably from 10 to 50 Å, though the film thickness may vary according to the material used for forming the surface layer.

EFFECT OF THE INVENTION

The optical recording media of the present invention have such a structure that the recording layer consisting essentially of Te and additionally containing Cr, C and H is laminated onto the substrate composed of the ethylene-cycloolefin random copolymer. Hence, they have such characteristics that they are excellent in the adhesion of the substrate to the recording layer and have excellent resistance to oxidation and long-term stability of recording property.

Further, the recording sensitivity in the recording layer is improved and recording margin is enlarged.

The water absorption value of the copolymer used as substrate material of this invention is lower than that of common resin such as polycarbonate resin, and therefore the substrate composed of said copolymer requires before sputtering only about a half of an evacuating time required by the substrate composed of polycarbonate resin. Accordingly, the productivity of the discs of this invention will be significantly increased.

The present invention is illustrated below in detail with reference to examples, but it should be construed that the invention is in no way limited to those examples.

EXAMPLE 1

After evacuating a vacuum receptacle, Ar gas and $CH_4$ gas were introduced into the receptacle, and an internal pressure in the receptacle as set at $6 \times 10^{-3}$ Torr (gas flow ratio of $Ar/CH_4 = 9/1$). In the receptacle, Te and Cr were used as targets and simultaneously sputtered, while controlling the voltage applied to each target and sputtering time, to obtain a recording layer composed of $Te_{87}Cr_2C_4H_7$ and having a film thickness of 240 Å on an optical disc substrate (hereinafter referred to as PO (1) substrate) composed of a non-crystalline copolymer of ethylene and 1,4,5,8-dimethano-1,2,3,4,4a,5,8,8a-octahydronaphthalene (chemical structure formula:

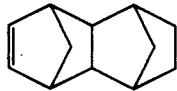

hereinafter abbreviated to DMON), whereby an optical recording medium could be obtained. Said copolymer had an ethylene unit of 59 mol % and a DMON unit of 41 mol % as measured by $^{13}$C-NMR analysis, an intrinsic viscosity [$\eta$] of 0.42 dl/g as measured at 135° C. in decalin and a softening temperature (TMA) of 154° C.

EXAMPLE 2

The procedure of Example 1 was repeated with the exception of setting the film thickness of 290 Å to obtain a recording layer composed of $Te_{87}Cr_2C_4H_7$ on the PO (1) substrate.

EXAMPLE 3 AND 4

The optical recording media obtained in Examples 1 and 2, respectively, were subjected individually to heat treatment at a temperature of 100° C. in $N_2$ atmosphere for 20 minutes.

EXAMPLE 5

The procedure of Example 1 was repeated by using the gas flow ratio of $Ar/CH_4 = 9/1$ with the exception of using a $Te_{97}Cr_3$ alloy target to obtain a recording layer composed of $Te_{87}Cr_2C_4H_7$ and having a film thickness of 230 Å on the PO(1) substrate. Thus obtained optical recording medium was subjected to heat treatment at a temperature of 100°C. in $N_2$ atmosphere for 20 minutes.

EXAMPLE 6

After evacuating a vacuum receptacle, Ar gas and $CH_4$ gas were introduced into the receptacle, and an internal pressure in the receptacle was set at $6 \times 10^{-3}$ Torr (gas flow ratio of $Ar/CH_4 = 9/1$). In the receptacle, Te and Cr were used as targets and simultaneously sputtered, while controlling the voltage applied to each target and sputtering time, to obtain a recording layer containing Te, Cr, C and H on the PO (1) substrate, the atomic ratio of Te, Cr and C in said recording layer being represented by the formula $(Te_{98.8}Cr_{1.2})_{96}C_4$ and having a film thickness of 240 Å.

EXAMPLE 7

The procedure of Example 6 was repeated with the exception of setting the film thickness of 290 Å to obtain a recording layer containing Te, Cr, C and H on the PO (1) substrate, the atomic ratio of Te, Cr and C in said recording layer being represented by the formula $(Te_{98}Cr_2)_{96}C_4$.

EXAMPLE 8

The procedure of Example 6 was repeated with the exception of setting the film thickness to 260 Å to obtain a recording layer containing Te, Cr, C and H on the PO (1) substrate, the atomic ratio of Te, Cr, and C in said recording layer being represented by the formula $(Te_{96.8}Cr_{3.2})_{96}C_4$.

EXAMPLE 9

The procedure of Example 6 was repeated with the exception of setting the film thickness to 230 Å to obtain a recording layer containing Te, Cr, C and H on the PO (1) substrate, the atomic ratio of Te, Cr and C in said recording layer being represented by the formula $(Te_{92}Cr_8)_{98}C_2$.

EXAMPLE 10

The procedure of Example 6 was repeated with the exception of using a $Te_{97}Cr_3$ alloy target and setting the film thickness to 230 Å to obtain a recording layer containing Te, Cr, C and H on the PO (1) substrate, the atomic ratio of Te, Cr and C in the said recording layer being represented by the formula $(Te_{97.5}Cr_{2.5})_{96}C_4$.

EXAMPLE 11

The procedure of Example 6 was repeated with the exception of using a $Te_{94}Cr_6$ alloy target and setting the film thickness to 250 Å to obtain a recording layer containing Te, C and H on the PO (1) substrate, the atomic ratio of Te, Cr and C in said recording layer being represented by the formula $(Te_{95.1}Cr_{4.9})_{98}C_2$.

EXAMPLES 12-17

The optical recording media obtained in Examples 6-11, respectively, were subjected individually to heat treatment at a temperature of 100° C. in $N_2$ atmosphere for 20 minutes.

REFERENTIAL EXAMPLE 1

Preparation of a substrate composed of a cycloolefin random copolymer composition (i) Polymerization Example 1

Synthesis of the copolymer (A) having a softening temperature of not lower than 70° C.

With a 2-litre glass polymerization reactor equipped with a stirring blade, there was carried out continuously a copolymerization reaction between ethylene and DMON. That is, into the polymerization reactor were continuously charged a solution of DMON in cyclohexane so that the DMON concentration in the polymerization reactor became 60 g/l, a solution of VO(OC$_2$H$_5$)Cl$_2$ as a catalyst in cyclohexane so that the vanadium concentration in the polymerization reactor became 0.9 mmol/l, and a solution of ethylaluminium sesquichloride (Al(C$_2$H$_5$)$_{1.5}$Cl$_{1.5}$) in cyclohexane so that the aluminium concentration in the polymerization reactor became 7.2 mmol/l, while continuously withdrawing from the bottom of the polymerization reactor the polymerization liquid so that the volume of the polymerization liquid in the polymerization reactor was constantly 1 litre. Simultaneously, into the polymerization reactor from the top of the polymerization reactor ethylene was fed at a rate of 85 l/hr. hydrogen was fed at a rate of 6 l/hr and nitrogen was fed at a rate of 45 l/hr. The copolymerization reaction was carried out at 10° C. by circulating a refrigerant through a jacket fitted externally to the polymerization reactor.

The copolymerization was carried out under the conditions as illustrated above, whereupon a polymerization reaction mixture containing an ethylene/DMON random copolymer was obtained. The polymerization reaction was stopped by adding a small amount of isopropyl alcohol to the polymerization liquid withdrawn from the bottom of the reactor. Thereafter, the polymerization liquid was poured into a household mixer containing acetone of about three times the volume of the polymerization liquid, while rotating the mixer, thereby depositing the resulting copolymer. The deposited copolymer was collected by filtration, dispersed in acetone so that the polymer concentration became about 50 g/l, and the copolymer was treated at the boiling point of acetone for 2 hours. After the treatment as above, the copolymer was collected by filtration and dried at 120° C. overnight (12 hours) under reduced pressure.

The thus obtained ethylene DMON-random copolymer (A) had an ethylene unit of 59 mol % as measured by $^{13}$C-NMR analysis, an intrinsic viscosity [$\eta$] of 0.42 dl/g as measured at 135° C. in decalin, and a softening temperature (TMA) of 154° C.

(ii) Polymerization Example 2

Synthesis of the copolymer (B) having a softening temperature of below 70° C.

The same copolymerization reaction as in Polymerization Example (i) was carried out except that DMON, VO(OC$_2$H$_5$)Cl$_2$ and ethylaluminium sesquichloride were fed into the polymerization reactor so that the concentrations of DMON, VO(OC$_2$H$_5$)Cl$_2$ and ethylaluminium sesquichloride in the polymerization reactor became 23 g/l, 0.7 mmol/l and 5.6 mmol/l, respectively, and that ethylene, hydrogen and nitrogen were fed into the polymerization reactor at rates of 140 l/hr, 13 l/hr and 25 l/hr, respectively, and the polymerization temperature was 10° C. After the completion of the copolymerization, the resulting copolymer was deposited, collected and dried at 180° C. under reduced pressure for 12 hours as in Polymerization Example (i).

The thus-obtained ethylene DMON copolymer (B) had an ethylene unit of 89 mol % as measured by $^{13}$C-NMR analysis, an intrinsic viscosity [$\eta$] of 0.44 dl/g as measured at 135° C. in decalin and a softening temperature (TMA) of 39° C.

(iii) Preparation of substrate composed of a cycloolefin random copolymer composition 400 g of the copolymer (A) prepared in Polymerization Example (i) and 4 g of the copolymer (B) prepared in Polymerization Example (ii) (A/B = 100/1 by weight) were introduced into 8 liter of cyclohexane and dissolved at about 50° C. while thoroughly stirring to obtain a homogeneous solution. The thus obtained homogeneous solution was poured in 24 liters of acetone to deposit an (A)/(B) blend. The thus obtained blend was dried at 120° C. under reduced pressure overnight.

The (A)/(B) blend thus obtained was incorporated with 0.5% of tetrakis[methylene-3-(3,5-di-t-butyl-4-hydroxyphenyl)propionate]methane, 0.05% of zinc stearate and 0.5% of glycerin monostearate as stabilizers, each amount being based on the total weight of the copolymers (A) and (B). The resulting blend was pelletized at 23° C. by using an extruder (L/D=20) having 20 mm$\phi$ and molded into an optical disc substrate (hereinafter referred to as PO (2) substrate) of 130 mm$\phi$ 1.2 mm in thickness by using an injection molding machine.

EXAMPLE 18

After evacuating a vacuum receptacle, Ar gas and CH$_4$ gas were introduced into the receptacle, and an internal pressure was preset at $6 \times 10^{-3}$ Torr (the gas flow ratio of Ar/CH$_4$=9/1). In the receptacle, Te and Cr were used as targets and simultaneously sputtered, while controlling the voltage applied to each target and the sputtering time, to obtain a recording layer composed of Te$_{87}$Cr$_2$C$_4$H$_7$ and having a film thickness of 240 Å on the PO (2) substrate composed of the cycloolefin random copolymer composition obtained in Referential Example 1, thus obtaining an optical recording medium.

EXAMPLE 19

The procedure of Example 18 was repeated with the exception of setting the film thickness to 290 Å to obtain a recording layer composed of Te$_{87}$Cr$_2$C$_4$H$_7$ on the PO (2) substrate.

EXAMPLES 20 AND 21

The optical recording media obtained in Examples 18 and 19, respectively, were subjected individually to heat treatment at a temperature of 100° C. in N$_2$ atmosphere for 20 minutes.

EXAMPLE 22

The procedure of Example 18 was repeated by using the gas flow ratio of Ar/CH$_4$=9/1 with the exception of using a Te$_{97}$Cr$_3$ alloy target to obtain a recording layer composed of Te$_{87}$Cr$_2$C$_4$H$_7$ and having a film thickness of 230 Å on the PO (2) substrate.

EXAMPLES 23

After evacuating a vacuum receptacle, Ar gas and CH$_4$ gas were introduced into the receptacle, and an internal pressure in the receptacle was set at $6 \times 10^{-3}$ Torr (gas flow ratio of Ar/CH$_4$=9/1). In the receptacle, Te and Cr were used as targets and simultaneously sputtered, while controlling the voltage applied to each target and sputtering time, to obtain a recording layer containing Te, Cr, C and H on the PO (2) substrate, the atomic ratio of Te, Cr and C in said recording layer being represented by the formula $(Te_{98.8}Cr_{1.2})_{96}C_4$ and having a film thickness of 240 Å.

EXAMPLE 24

The procedure of Example 23 was repeated with the exception of setting the film thickness to 290 Å to obtain a recording layer containing Te, Cr, C and H on the PO (2) substrate, the atomic ratio of Te, Cr and C atoms in said recording layer being represented by the formula $(Te_{98}Cr_2)_{96}C_4$.

EXAMPLE 25

The procedure of Example 23 was repeated with the exception of setting the film thickness to 260 Å to obtain a recording layer containing Te, Cr, C and H on the PO (2) substrate, the atomic ratio of Te, Cr, and C in said recording layer being represented by the formula $(Te_{96.8}Cr_{3.2})_{96}C_4$.

EXAMPLE 26

The procedure of Example 23 was repeated with the exception of setting the film thickness of 230 Å to obtain a recording layer containing Te, Cr, C and H on the PO (2) substrate, the atomic ratio of Te, Cr and C in said recording layer being represented by the formula $(Te_{92}Cr_8)_{98}C_2$.

EXAMPLE 27

The procedure of Example 23 was repeated with the exception of using a $Te_{97}Cr_3$ alloy target and setting the film thickness to 230 Å to obtain a recording layer containing Te, Cr, C and H on the PO (2) substrate, the atomic ratio of Te, Cr, and C in said recording layer being represented by the formula $(Te_{97.5}Cr_{2.5})_{96}C_4$.

EXAMPLE 28

The procedure of Example 23 was repeated with the exception of using a $Te_{94}Cr_6$ alloy target and setting the film thickness to 250 Å to obtain a recording layer containing Te, Cr, C and H on the PO (2) substrate, the atomic ratio of Te, Cr and C in said recording layer being represented by the formula $(Te_{95.1}Cr_{4.9})_{98}C_2$.

EXAMPLES 29–34

The optical recording media obtained in Examples 23–28, respectively, were subjected individually to heat treatment at a temperature of 100° C. in $N_2$ atmosphere for 20 minutes.

TEST RESULTS (1) A disc of optical recording medium was rotated at a rate of 1800 rpm and irradiated with laser beam at a frequency of 3.7 MHz to examine recording characteristics. C/N max as used herein is intended to show a maximum value of C/N when a laser power is changed. The recording sensitivity is intended to show a minimum value of the laser power when C/N max×0.9<C/N is attained, and the margin is intended to show the range of the laser power when C/N max=0-.9<C/N is attained.

The results are shown in Table 2.

TABLE 2

| | C/N max (dB) | Recording sensitivity (mW) | Margin (mW) |
|---|---|---|---|
| Example 1 | 50 | 6.3 | 0.8 |
| Example 2 | 51 | 7.0 | 0.5 |
| Example 3 | 55.5 | 5.8 | 2.2 |

TABLE 2-continued

| | C/N max (dB) | Recording sensitivity (mW) | Margin (mW) |
|---|---|---|---|
| Example 4 | 56 | 6.6 | 1.4 |
| Example 5 | 55.5 | 5.9 | 2.1 |
| Example 6 | 51 | 6.5 | 0.5 |
| Example 7 | 51 | 7.0 | 0.5 |
| Example 8 | 52.5 | 6.4 | 0.6 |
| Example 9 | 54 | 6.0 | 2.0 |
| Example 10 | 53.5 | 6.1 | 1.3 |
| Example 11 | 53 | 6.6 | 0.9 |
| Example 12 | 55.5 | 5.8 | 2.2 |
| Example 13 | 56 | 6.6 | 1.4 |
| Example 14 | 55 | 6.4 | 2.1 |
| Example 15 | 49 | 6.6 | 2.7 |
| Example 16 | 55.5 | 5.9 | 2.6 |
| Example 17 | 52.5 | 6.7 | 1.9 |
| Example 18 | 50 | 6.3 | 0.8 |
| Example 19 | 51 | 7.0 | 0.5 |
| Example 20 | 55.5 | 5.8 | 2.2 |
| Example 21 | 56 | 6.6 | 1.4 |
| Example 22 | 55.5 | 5.9 | 2.1 |
| Example 23 | 51 | 6.5 | 0.5 |
| Example 24 | 51 | 7.0 | 0.5 |
| Example 25 | 52.5 | 6.4 | 0.6 |
| Example 26 | 54 | 6.0 | 2.0 |
| Example 27 | 53.5 | 6.1 | 1.3 |
| Example 28 | 53 | 6.6 | 0.9 |
| Example 29 | 55.5 | 5.8 | 2.2 |
| Example 30 | 56 | 6.6 | 1.4 |
| Example 31 | 55 | 6.4 | 2.1 |
| Example 32 | 49 | 6.6 | 2.7 |
| Example 33 | 55.5 | 5.9 | 2.6 |
| Example 34 | 52.5 | 6.7 | 1.9 |

(2) Reflectivity R measured after 500 hours of allowing a disc of optical recording medium under the circumstances of 70° C. and 85% RH was compared with the initial reflectivity $R_0$ to examine percentage variation in reflectance.

The results are shown in Table 3.

TABLE 3

| | Percentage variation in reflectance $(R_0 - R) \times 100/R_0$ |
|---|---|
| Example 3 | 2% |
| Example 12 | 2% |
| Example 20 | 2% |
| Example 29 | 2% |

EVALUATION OF ADHESION BETWEEN THE SUBSTRATE AND THE RECORDING LAYER

The adhesion between the substrate and the recording layer of each of the optical recording media obtained in Examples 3 and 20 was evaluated in the following manner. The results are shown in Table 4.

ADHESION TEST

Cross-cut Adhesive test (JIS K5400)

On the recording layer, there are drawn 11 parallel lines at right angles to each other in each direction of length and width at 1 mm intervals by means of a cutter knife. Cuts in the form of the squares of a checkerboard are made so as to give 100 squares per 1 $cm^2$.

Evaluation on peeling is made by using cellophane tape (a product of Nichiban).

EVALUATION (1) Immediately after the formation of the recording layer (2) After the lapse of 100 hours under the circumstances of 80° C. and 85% RH

TABLE 4

| | Substrate | Optical recording layer | Cross-cut adhesive test results immediately after formation of recording layer | after the lapse of 100 hr at 80° C./85% RH |
|---|---|---|---|---|
| Example 3 | PO(1) substrate | Te₈₇Cr₂C₄H₇ | 100/100* not peeled | — |
| Example 20 | PO(2) substrate | Te₈₇Cr₂C₄H₇ | 100/100* no peeled | 100/100* not peeled |

*100/100 shows that among 100 squares, the number of squares which are not peeled off is 100.

What is claimed is:

1. An optical recording medium comprising a substrate and a recording layer formed thereon, in which the recording layer is irradiated with beam of energy to form thereon pits corresponding to given pieces of information and thereby record the pieces of information, said recording layer being a thin film consisting essentially of Te and additionally containing Cr, C and H and said substrate comprising a cycloolefin random copolymer composed of a ethylene unit and a cycloolefin unit derived from the following general formula [I]

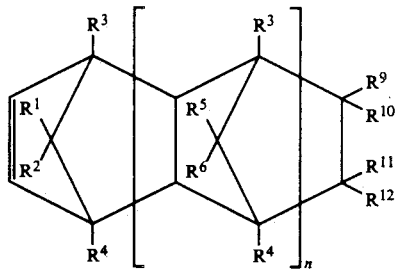

[I]

wherein n is 0 or a positive integer, $R^1$ to $R^{12}$ are the same or difference, and represent each hydrogen atom, a halogen atom or a hydrocarbon group, provided that $R^9$ to $R^{12}$, when taken together, may form a mono-or poly-cyclic hydrocarbon ring which may optionally have double bond or bonds, or $R^9$ and $R^{10}$ or $R^{11}$ and $R^{12}$, when taken together, may form an alkylidene group.

2. The optical recording medium as claimed in claim 1 wherein the substrate comprises a cycloolefin random copolymer having a softening temperature (TMA) of not lower than 70° C.

3. The optical recording medium as claimed in claim 1 wherein the contents of Cr in the recording layer is from 0.1 to 40 atom % based on the total atoms present in the recording layer.

4. The optical recording medium as claimed in claim 1 wherein the contents of C in the recording layer is less than 40 atom % based on the total atoms present in the recording layer.

5. The optical recording medium as claimed in claim 1 wherein the contents of H in the recording layer is from 1 to 40 atom % based on the total atoms present in the recording layer.

6. The optical recording medium as claimed in claim 1 wherein the film thickness of the recording layer is from 100 Å to 1 μm.

7. An optical recording medium comprising a substrate and a recording layer formed thereon, in which the recording layer is irradiated with beam of energy to form thereon pits corresponding to given pieces of information and thereby record the pieces of information, said recording layer being a thin film consisting essentially of Te and additionally containing Cr, C and H and said substrate consisting of a cycloolefin random copolymer composition comprising:

[A] a cycloolefin random copolymer composed of an ethylene unit and a cycloolefin unit derived from the following general formula [I] and having an intrinsic viscosity [72] of from 0.05 to 10 dl/g as measured at 135° C. in decalin and a softening temperature (TMA) of not lower than 70° C., and

[B] a cycloolefin random copolymer composed of an ethylene unit and a cycloolefin unit derived from the following general formula [I] and having an intrinsic viscosity [η] of from 0.05 to 5 dl/g as measured at 135° C. in decalin and a softening temperature (TMA) of below 70° C., in such a proportion that the ratio by weight of the component [A] to the component [B] is in the range of from 100/0.1 to 100/10,

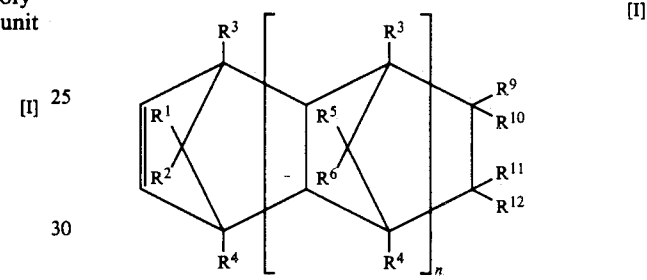

[I]

wherein n is 0 or a positive integer, $R^1$ to $R^{12}$ are the same or difference, and represent each hydrogen atom, a halogen atom or a hydrocarbon group, provided that $R^9$ to $R^{12}$, when taken together, may form a mono- or poly-cyclic hydrocarbon ring which may optionally have double bond or bonds, or $R^9$ and $R^{10}$ or $R^{11}$ and $R^{12}$, when taken together, may form an alkylidene group.

8. The optical recording medium as claimed in claim 7 wherein the contents of Cr in the recording layer is from 0.1 to 40 atom % based on the total atoms present in the recording layer.

9. The optical recording medium as claimed in claim 7 wherein the contents of C in the recording layer is less than 40 atom % based on the total atoms present in the recording layer.

10. The optical recording medium as claimed in claim 7 wherein the contents of H in the recording layer is from 1 to 40 atom % based on the total atoms present in the recording layer.

11. The optical recording medium as claimed in claim 7 wherein the film thickness of the recording layer is from 100 Å to 1 μm.

12. An optical recording medium of improved sensitivity comprising a substrate and a recording layer in which the recording layer has improved adhesion to the substrate and improved oxidation resistance and in which the recording layer is irradiated with a beam of energy to form thereon pits corresponding to given pieces of information and thereby record the pieces of information, said recording layer being a thin film consisting essentially of Te, Cr, C and H, wherein Cr is present in an amount of from 0.1 to 40%, based on the total atoms present in the recording layer, C is present in an amount of less than 40 atom %, based on the total atoms present in the recording layer, and H is present in an amount of from 1 to 40 atom %, based on the total atoms present in the recording layer, and said substrate comprises a cycloolefin random copolymer composed of an ethylene unit and a cycloolefin unit from a cycloolefin of the general formula (I)

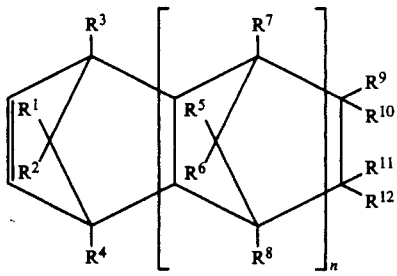

(I)

wherein n is 0 or a positive integer, $R^1$ to $R^{12}$ are the same or different and each represents a hydrogen atom, a halogen atom or a hydrocarbon group, provided that $R^9$ to $R^{12}$, when taken together, may form a mono- or poly-cyclic hydrocarbon ring which may optionally have a double bond or bonds, or $R^9$ and $R^{10}$ or $R^{11}$ and $R^{12}$, when taken together, may form an alkylidene group.

13. The optical recording medium as claimed in claim 12 wherein the substrate comprises a cycloolefin random copolymer having a softening temperature (TMA) of not lower than 70° C.

14. The optical recording medium as claimed in claim 1 wherein the content of Cr in the recording layer is from 0.5 to 10 atom %, based on the total atoms present in the recording layer.

15. The optical recording medium as claimed in claim 14 wherein the content of Cr in the recording layer is from 1 to 4 atom %, based on the total atoms present in the recording layer.

16. The optical recording medium as claimed in claim 12 wherein the content of C in the recording layer is from 3 to 20 atom %, based on the total atoms present in the recording layer.

17. The optical recording medium as claimed in claim 12 wherein the content of H in the recording layer is from 3 to 25 atom %, based on the total atoms present in the recording layer.

18. The optical recording medium as claimed in claim 12 wherein the film thickness of the recording layer is from 100 Å to 1 μm.

19. The optical recording medium as claimed in claim 12 wherein the content of Te in the recording layer is at least 87 atom %, based on the total atoms present in the recording layer.

20. An optical recording medium of improved sensitivity comprising a substrate and a recording layer in which the recording layer has improved adhesion to the substrate and improved oxidation resistance and in which the recording layer is irradiated with a beam of energy to form thereon pits corresponding to given pieces of information and thereby record the pieces of information, said recording layer being a thin film consisting essentially of Te, Cr, C and H, wherein Cr is present in an amount of from 0.1 to 40 atom %, based on the total atoms present in the recording layer, C is present in an amount of less than 40 atom %, based on the total atoms present in the recording layer, and H is present in an amount of from 1 to 40 atom %, based on the total atoms present in the recording layer, and said substrate comprises a cycloolefin random copolymer composition comprising:

[A] a cycloolefin random copolymer composed of an ethylene unit and a cycloolefin unit from a cycloolefin of the general formula (I)

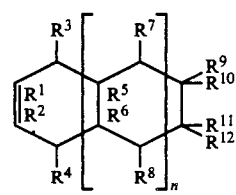

(I)

wherein n is 0 or a positive integer, $R^1$ to $R^{12}$ are the same or different and each represents a hydrogen atom, a halogen atom or a hydrocarbon group, provided that $R^9$ to $R^{12}$, when taken together, may form a mono- or poly-cyclic hydrocarbon ring which may optionally have a double bond or bonds, or $R^9$ and $R^{10}$ or $R^{11}$ and $R^{12}$, when taken together, may form an alkylidene group, and having an intrinsic viscosity [η] of from 0.05 to 10 dl/g as measured at 135° C. in decalin and a softening temperature (TMA) of not lower than 70° C., and (B) a cycloolefin random copolymer composed of an ethylene unit and a cycloolefin unit from a cycloolefin of said general formula (I), and having an intrinsic viscosity [η] of from 0.05 to 5 dl/g as measured at 135° C. in decalin and a softening temperature (TMA) of below 70° C., in such a proportion that the ratio by weight of the component (A) to the component (B) is in the range of from 100/0.1 to 100/10.

21. The optical recording medium as claimed in claim 20 wherein the content of Cr in the recording layer is from 0.5 to 10 atom %, based on the total atoms in the recording layer.

22. The optical recording medium as claimed in claim 21 wherein the content of Cr in the recording layer is from 1 to 4 atom %, based on the total atoms in the recording layer.

23. The optical recording medium as claimed in claim 20 wherein the content of C in the recording layer is from 3 to 20 atom %, based on the total atoms present in the recording layer.

24. The optical recording medium as claimed in claim 20 wherein the content of H in the recording layer is from 3 to 25 atom %, based on the total atoms present in the recording layer.

25. The optical recording medium as claimed in claim 20 wherein the film thickness of the recording layer is from 100 Å to 1 μm.

26. The optical recording medium as claimed in claim 20, wherein the content of Te in the recording layer is at least 87 atom %, based on the total atoms present in the recording layer.

* * * * *

UNITED STATES PATENT AND TRADEMARK OFFICE
CERTIFICATE OF CORRECTION

PATENT NO. : 4,994,354

DATED : February 19, 1991

INVENTOR(S) : Hisaharu TOIBANA and Takeshi MINODA

It is certified that error appears in the above-identified patent and that said Letters Patent is hereby corrected as shown below:

Column 34, lines 11-20, please correct Formula (I) to read as follows:

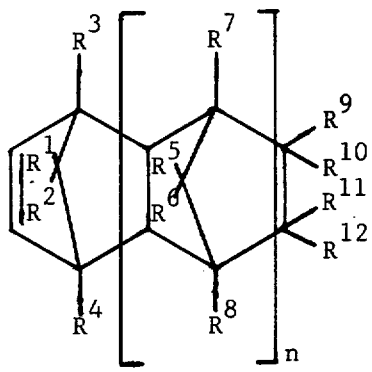

Signed and Sealed this

Eighth Day of December, 1992

*Attest:*

DOUGLAS B. COMER

*Attesting Officer*      *Acting Commissioner of Patents and Trademarks*